(12) United States Patent
Hill et al.

(10) Patent No.: US 6,675,905 B2
(45) Date of Patent: Jan. 13, 2004

(54) PLUG AERATOR

(75) Inventors: Jonn W. Hill, Powell, OH (US); Elmer J. Chatin, Fredericktown, OH (US)

(73) Assignee: Ohio Steel Industries, Inc., Columbus, OH (US)

( * ) Notice: Subject to any disclaimer, the term of this patent is extended or adjusted under 35 U.S.C. 154(b) by 30 days.

(21) Appl. No.: 09/790,850

(22) Filed: Feb. 22, 2001

(65) Prior Publication Data

US 2002/0084082 A1 Jul. 4, 2002

Related U.S. Application Data

(60) Provisional application No. 60/258,832, filed on Dec. 27, 2000.

(51) Int. Cl.[7] .............................................. A01B 45/02
(52) U.S. Cl. .......................................... 172/22; 172/544
(58) Field of Search ............................. 172/45, 21, 22, 172/56, 57, 60, 545, 548, 549, 557, 556, 552, 544

(56) References Cited

U.S. PATENT DOCUMENTS

| | | | |
|---|---|---|---|
| 2,591,572 A | * | 4/1952 | Mascaro |
| 2,700,926 A | * | 2/1955 | Goit |
| 2,974,888 A | | 3/1961 | Everett ........................ 241/191 |
| 3,008,526 A | | 11/1961 | Cohen .......................... 172/45 |
| 3,171,498 A | | 3/1965 | Logan ......................... 172/22 |
| 3,388,750 A | | 6/1968 | Hamm ......................... 172/45 |
| 3,643,746 A | * | 2/1972 | Dedoes |
| 3,716,005 A | * | 2/1973 | Fennell |
| 4,148,362 A | * | 4/1979 | Orth |
| 4,773,486 A | | 9/1988 | Huber et al. .................. 172/22 |
| 4,840,232 A | * | 6/1989 | Mayer .......................... 172/21 |
| 5,119,880 A | * | 6/1992 | Zehrung, Jr. et al. ......... 172/22 |
| 5,586,603 A | * | 12/1996 | Mattis ......................... 172/21 |
| 5,611,291 A | * | 3/1997 | Pogue .......................... 111/14 |
| 5,623,996 A | * | 4/1997 | Postema ...................... 172/118 |
| 5,680,903 A | | 10/1997 | Oliver .......................... 172/22 |
| 5,769,169 A | * | 6/1998 | Miksitz ........................ 172/21 |

FOREIGN PATENT DOCUMENTS

| | | | | |
|---|---|---|---|---|
| CA | 960905 | * | 1/1975 | .................. 172/21 |
| DE | 2453076 | * | 5/1975 | .................. 172/21 |
| GB | 1089843 | * | 11/1967 | .................. 172/21 |
| GB | 1454900 | * | 11/1976 | .................. 172/21 |
| GB | 2160401 | * | 12/1985 | .................. 172/21 |
| GB | 2225692 | * | 6/1990 | .................. 172/21 |

OTHER PUBLICATIONS

Aer Way The Better Way to revitalize the soil and increase yield, brochure, Jan. 1980, 6 pages.*

Aer Way—A New Angle On Turf Aeration, brochure, Jan. 1985, 4 pages.*

* cited by examiner

*Primary Examiner*—Victor Batson
(74) *Attorney, Agent, or Firm*—James R. Eley; Thompson Hine LLP

(57) ABSTRACT

A method and apparatus for core extracting plug aerator comprises a main frame, a draw bar coupled to the main frame and configured to couple a motorized device to the main frame, and pivoting side supports coupled to the main frame, wherein the side supports pivot between and are secured in a moving position and an aerating position. The plug aerator further comprises rotating wheels coupled to the side supports and a longitudinal support system coupled to the main frame, the longitudinal support system comprises a plugger system comprising articulating tines.

20 Claims, 7 Drawing Sheets

PLUG AERATOR

This application claims benefit to Provision Application No. 60/258,832 filed Dec. 27, 2001.

BACKGROUND OF THE INVENTION

This invention is directed towards aerators. More particularly, the invention relates to a core type aerator configured to eliminate damage around a top of a hole made through insertion and removal of tines extending from the aerator into the ground during aeration.

It is common practice in the treating of turf, such as on golf courses and similar groomed lawn areas, to aerate the turf. Aeration is performed by forming a pattern of generally cylindrical shaped holes in the turf that enable moisture, fertilizers, and the like, to more readily reach and stimulate root growth, which leads to a heartier turf.

Through aeration air and water, together with fertilizer and top dressing, are permitted to penetrate the turf after aeration with resultant improvement in the depth of the root structure of the grasses producing an end result of a luxurious grass mat. One type of aeration merely pokes holes into turf with spikes, or the like. A more productive type of aeration occurs where a plug or cylinder of turf or ground is cut and removed from the turf, which is contrasted with the aerification through spiking since in the latter spikes are forced into the turf. This actually compacts the soil around the hole in the ground, thereby impeding moisture penetration into the turf or ground. In the former method, the aeration holes are conventionally formed by an apparatus, termed an aerator, which includes a plurality of coring tines operative to penetrate the soil in a manner to remove generally cylindrical cores or plugs of turf.

In a core-type aerator, stationary tines are mounted in generally radial relation about a tine wheel that rotates about an axis transverse to the direction of movement of the aerator. The tines are conventionally mounted in circumferentially spaced rows, such that the tines sequentially penetrate the soil as the tine wheel rotates to create a pattern of aeration holes. Aerators of the rotary tine wheel type are generally further classified into two categories: towed or driven type aerators. Towed type aerators have tine wheels supported for substantially free rotation about their longitudinal axes and are caused to rotate in response to towing of the aerator by a tractor or the like through a draw bar or three-point hitch arrangement. On the other hand, driven tine wheel type aerators have a tine wheel that has a positive driven relation with motor means or the like carried by the aerator. The driven tine wheel type aerators are operative when energized to cause the tine wheel to rotate so as to propel the aerator, while simultaneously effecting tine penetration to aerate the underlying turf. Significant differences exist between these two types of aerators that influence the specific tine geometry best suited for each type aerator.

For example, the forces delivered to the soil through the tines, termed the tine penetration forces, are different for towed and driven tine wheel aerators. This difference dictates the need for different tine angles between towed and driven tine wheels. Tine angle is the angular relation between the longitudinal axis of the turf penetrating end of the tine and a radius extending from the rotational axis of the tine wheel and generally intersecting the point at which the tine extends from the tine wheel periphery. This relation may also be termed the tine orientation geometry.

For a towed type tine wheel, two forces must be supported by the soil: a component of the draw bar pulling force, and the weight of the machine. A driven type tine wheel also has two forces that must be supported by the soil: the weight of the machine and the resultant force of the driving torque acting on the tine wheel. This resultant driving torque force is generally larger than the draw bar component force of a towed type tine wheel so that the weight required to effect the same aerating core depth is generally less for a driven tine wheel type aerator. The differences in tine penetration forces between towed and driven tine wheel type aerators also change the instant center of rotation, or true rolling radius, of the tine wheel; specifically, the instant center of the driven tine wheel tends to be deeper in the soil than for a towed type tine wheel. This difference necessitates different tine angles or tine orientation geometry for the driven type tine wheels to provide optimum aerating performance. Based on the different angles needed tines enter the ground in non-vertical positions causing unwanted damage to turf surrounding the opening in the ground made during the penetration.

A desirable objective of rotary tine wheel type aerators, and particularly aerators employed to aerate golf course greens or other areas where relatively even surfaces are critical, is to form the aerification holes with minimum disturbance or lifting of the turf peripherally about the hole openings. Although several aerators have been developed for this purpose through angular arrangement or multiple tine arrangements, they still have major drawbacks. One is that although some hole opening disturbance is eliminated, other problems occur, such as channels being formed between hole openings based on the stationary nature of the tines.

Therefore, a need exists for a plug aerator that does not damage the ground around a hole or the ground in between the holes, where the holes are made during aeration.

SUMMARY OF THE INVENTION

According to the present invention, a method and apparatus for core extracting plug aerator comprises a main frame, a draw bar coupled to the main frame and configured to couple a motorized device to the main frame, and pivoting side supports coupled to the main frame, wherein the side supports pivot between and are secured in a moving position and an aerating position. The plug aerator further comprises rotating wheels coupled to the side supports and a longitudinal support system coupled to the main frame, the longitudinal support system comprises a plugger system comprising articulating tines.

A main advantage of the plug aerator according to a preferred embodiment of the present invention is that aeration holes are formed preferably without disturbing, or with minimum disturbance, of either the opening of the hole or the ground between holes based on the articulation of the tines.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENT(S)

Figure 1:
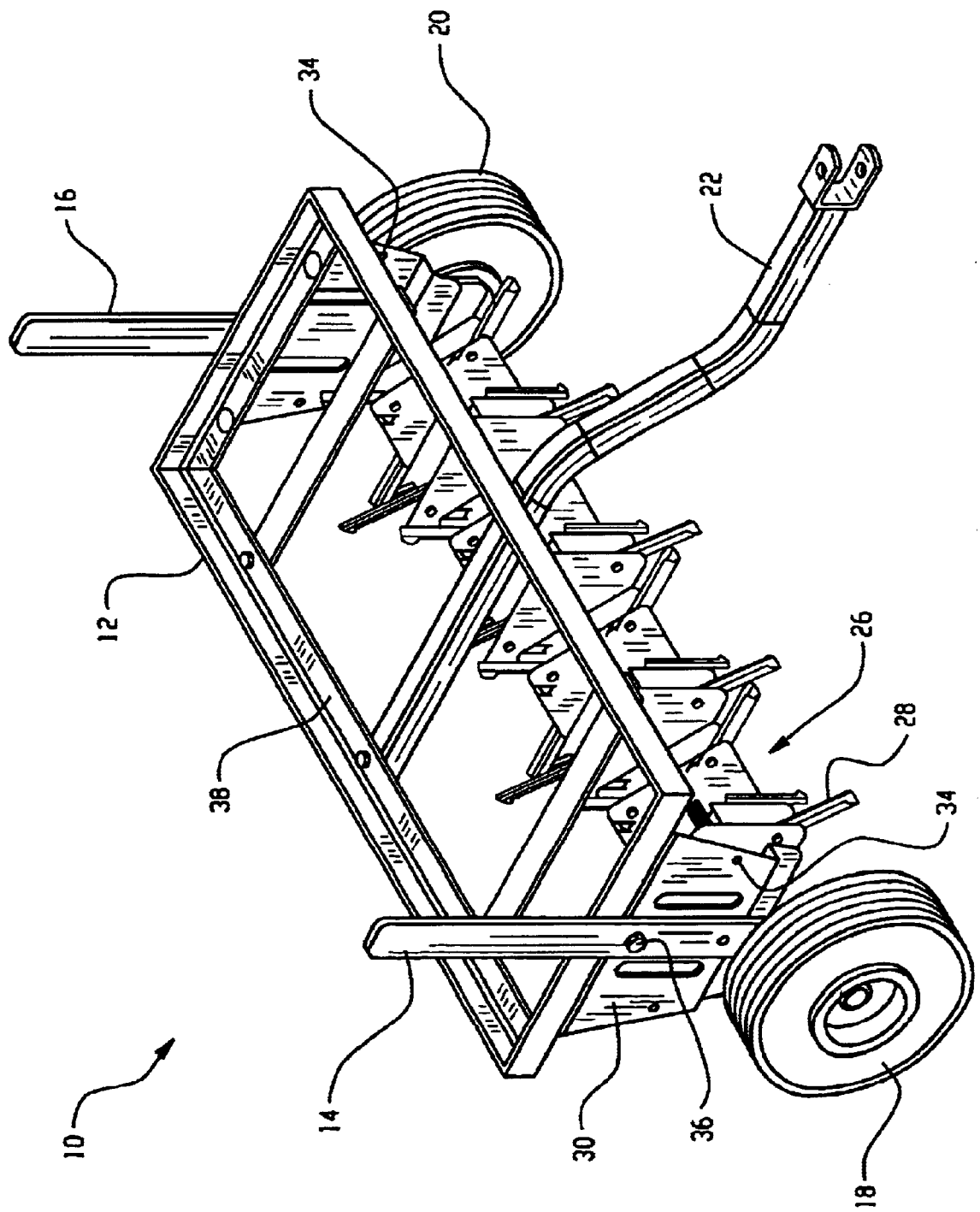
FIG. 1 is a perspective view of a plug aerator according to a preferred embodiment of the present invention.
Figure 2:
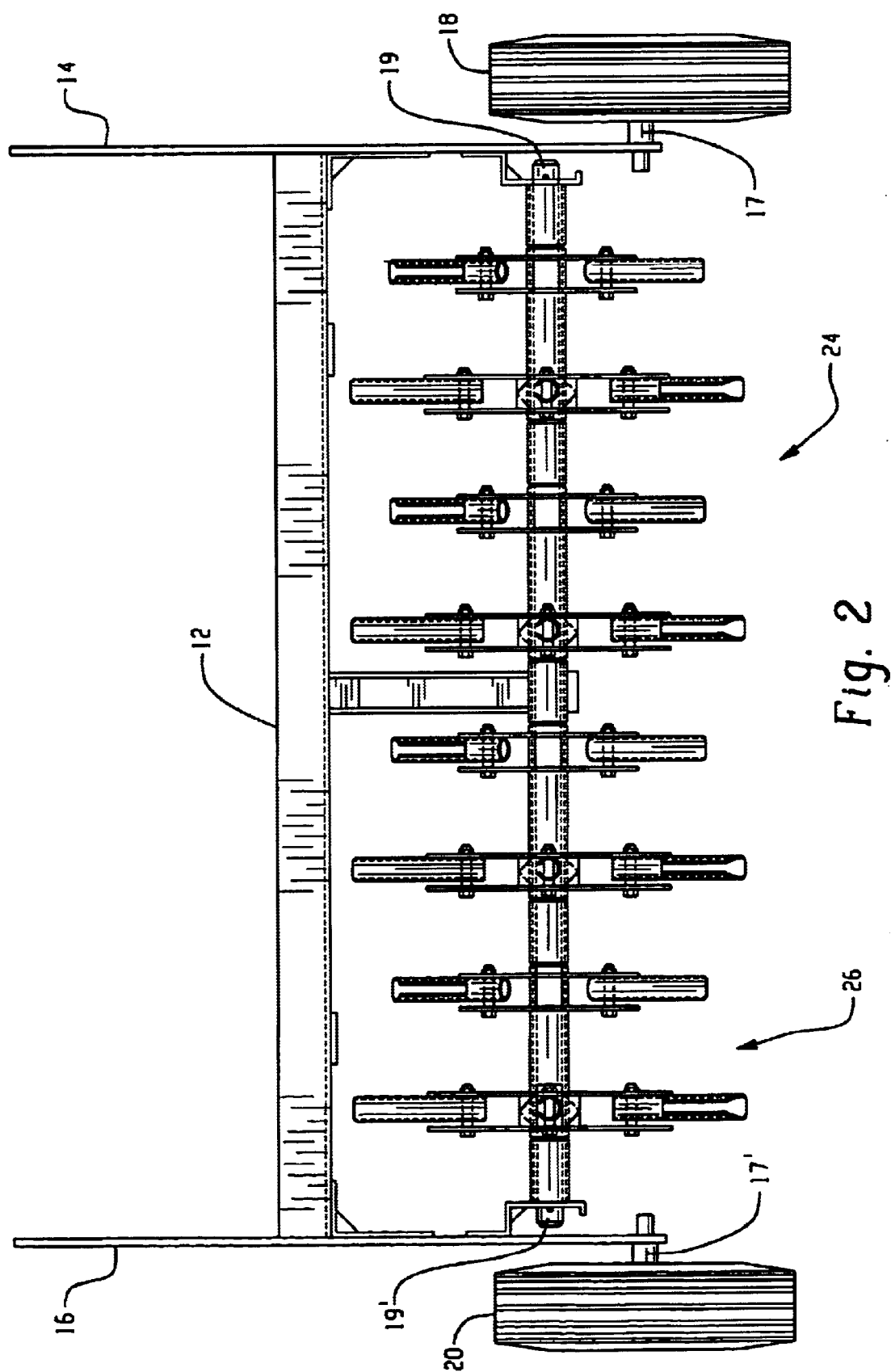
FIG. 2 is a rear view of the plug aerator in FIG. 1.

In FIGS. 1–2, a ground hole producing apparatus 10 according to a preferred embodiment of the present invention is shown. Preferably, the ground hole producing apparatus 10 is a core-type plug aerator. The plug aerator 10 comprises a main frame or chassis 12, first and second pivoting side supports 14 and 16 coupled to the main frame 12 at 17 and 17' (see FIG. 2), respectively, first and second rotating support wheels 18 and 20 coupled to the first and second side supports 14 and 16 at 19 and 19' (see FIG. 2), respectively, and an extension 22 coupled to the main frame 12. Preferably, the extension 22 is a draw bar that is coupled to a motorized device such as a mower or tractor (not shown) to tow or move the plug aerator. Also, the plug aerator 10 further comprises a longitudinal support system 24 (best seen in FIGS. 2, 3, and 4A) coupled to the main frame 12 (see FIG. 2), where the longitudinal support system 24 comprises rotating hole producing systems 26 with articulating hole producing devices 28 that articulate when interacting with a section of ground 200 (see FIG. 6). Preferably, the rotating hole producing systems 26 are plugger tine assemblies and the articulating hole producing devices 28 are tines with coupled springs, as described in more detail below.

It is to be appreciated that the plug aerator 10 and its elements may be manufactured from any known materials that are durable. Preferably, metallic, alloy, or durable plastic or composite materials are used for the various elements within the plug aerator 10.

Figure 6:
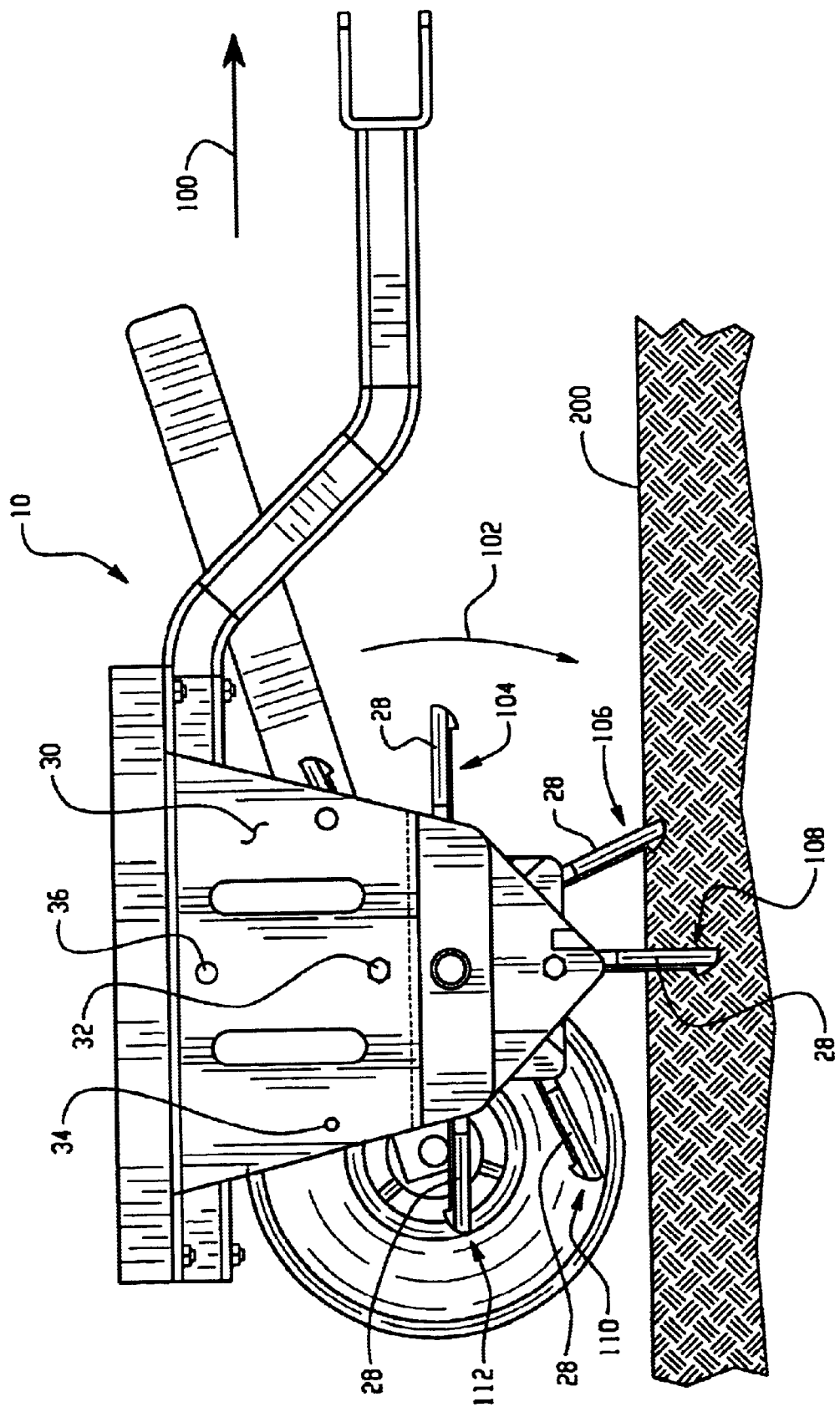
FIG. 6 is a left side operational view of the plug aerator in FIG. 1.

With continuing reference to FIG. 1, and reference to FIG. 6, the main frame or chassis 12 also includes a side portion 30 with a first aperture 32 and a second aperture 34. These apertures 32 and 34 allow the plug aerator 10 to adjust between a not-in-use position, when the side supports 14 and 16 are connected to aperture 32, and an in-use position, when the side supports 14 and 16 are connected to aperture 34. When in-use, the hole producing devices 28 engage or interact with a section of ground 200, as seen in FIG. 6, while when not-in-use the hole producing devices 28 have a predetermined clearance above the section of ground 200 so that they do not interact with the section of ground 200. This not-in-use position is utilized during transport of the plug aerator 10 or when passing from a ground to pavement section during aeration. The side supports 14 and 16 pivot at pivoting connection device 36 to move the plug aerator 10 between the in-use and not-in-use positions. Preferably, the side supports 14 and 16 are connected in either position through any connection device that functionally allows easy release when adjusting positions, e.g., a bolt and nut system, a tensioned pin system, or the like.

Once again with reference to FIG. 1, the main frame 12 further comprises a weight bearing section 38. This weight bearing section 38 is configured to hold a suitably weighted object so that when the plug aerator 10 is in a in-use position the hole producing devices 28 smoothly enter the section of ground 200 and extract a core of ground material. This operation will be described in more detail below in the discussion of FIG. 6.

Figure 3:
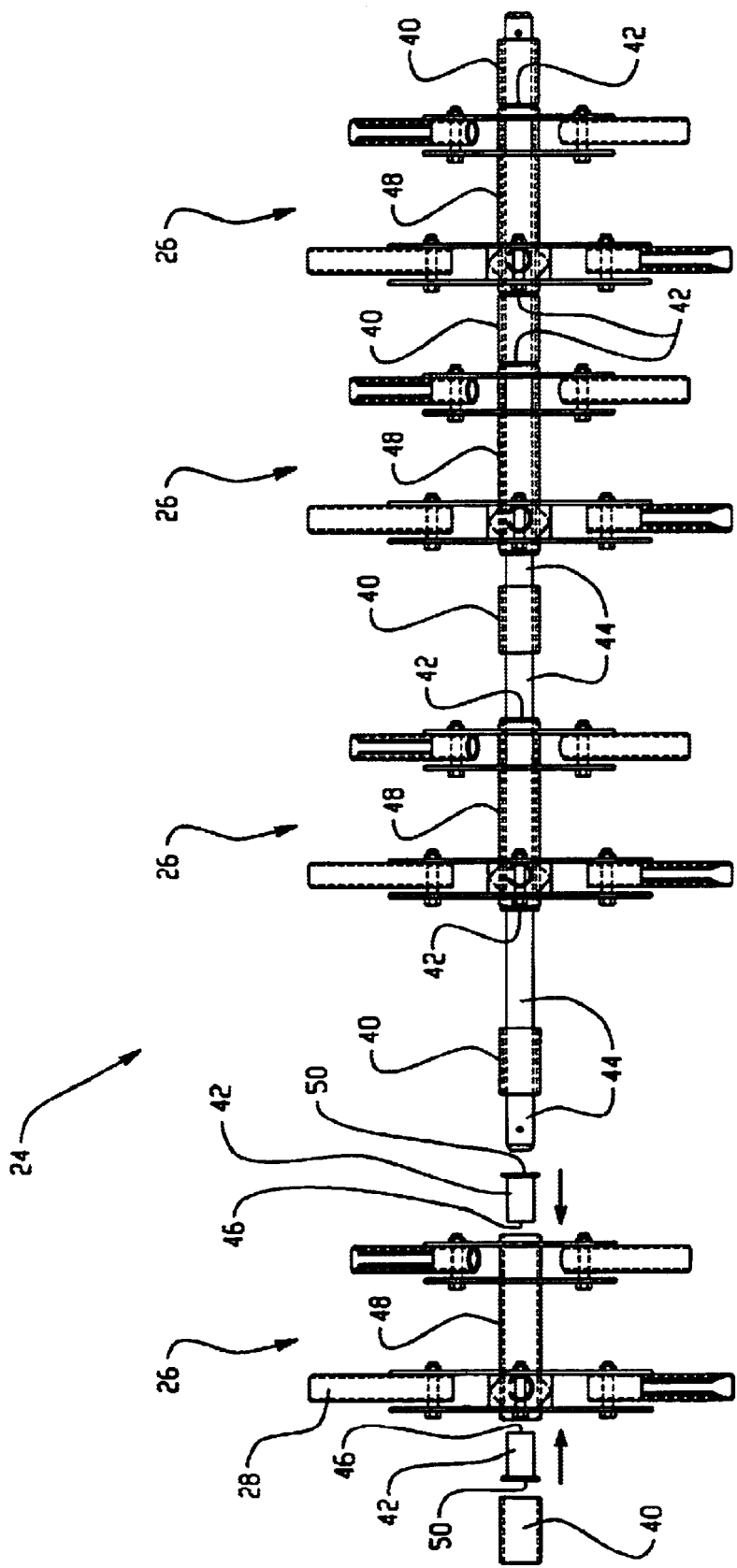
FIG. 3 is a partially exploded and partially assembled view of a longitudinal support section of the plug aerator in FIG. 1.
Figure 4A:
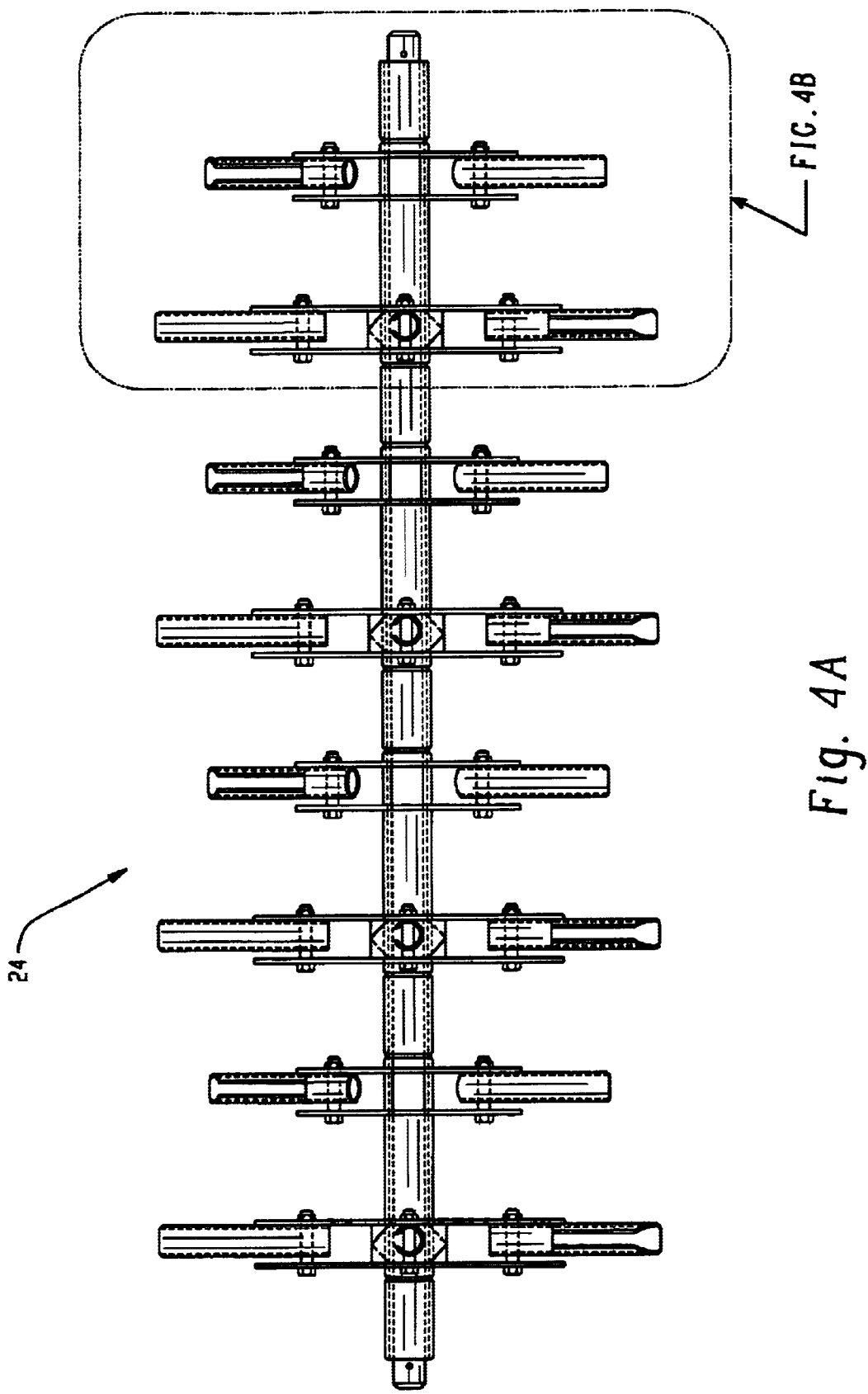
FIG. 4A is an assembled view of the longitudinal support section of the plug aerator in FIG. 1.
Figure 4B:
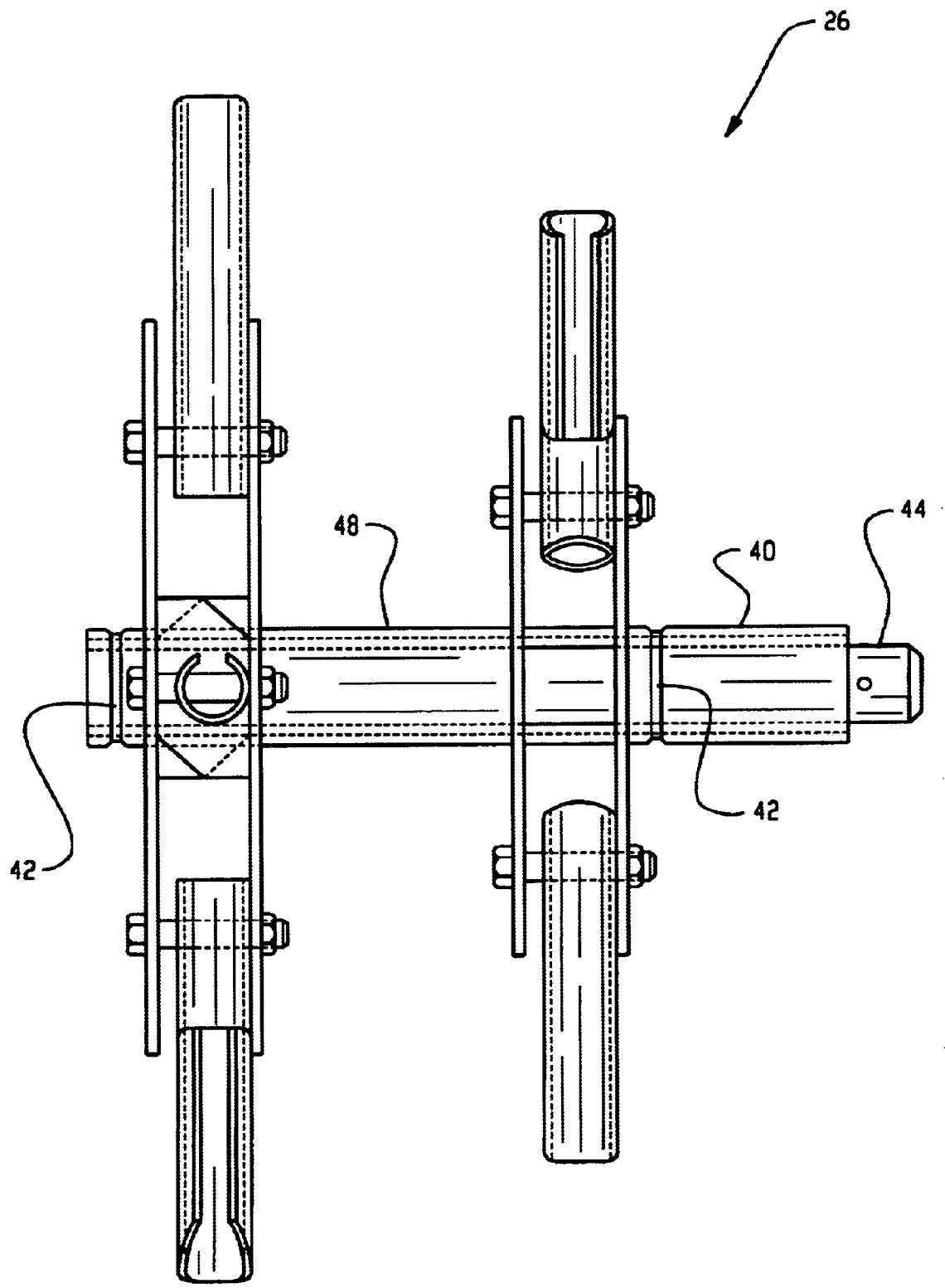
FIG. 4B is a zoomed in view of a section of the longitudinal support section of the plug aerator in FIGS. 1 and 4A.

Turning now to FIG. 3, the longitudinal support system 24 according to a preferred embodiment of the present invention is shown. Only one section of the longitudinal support system 24 will be discussed for convenience, where preferably the longitudinal support system 24 comprises four sections. Each section comprises a first spacer 40, two second spacers 42, and one of the hole producing systems 26 all coupled around an axle 44 so that the section can rotate around the axle 44 during operation/aeration. Preferably, the first spacers 40 are tube or cylindrical spacers and the second spacers 42 are PVC or other suitable plastic bushings. To assemble the section, one end 46 of each of the second spacers 42 slides in the direction of the arrow into a cylindrical or tube device 48 located in the hole producing system 26. An opposite end 50 of the second spacers 42 interacts with the first spacer 40 of the adjacent sections of the longitudinal support system 24. A filly assembled view of the longitudinal support system 24 is shown in FIG. 4A and a fully assembled section of the longitudinal support system is shown in FIG. 4B.

Figure 5:
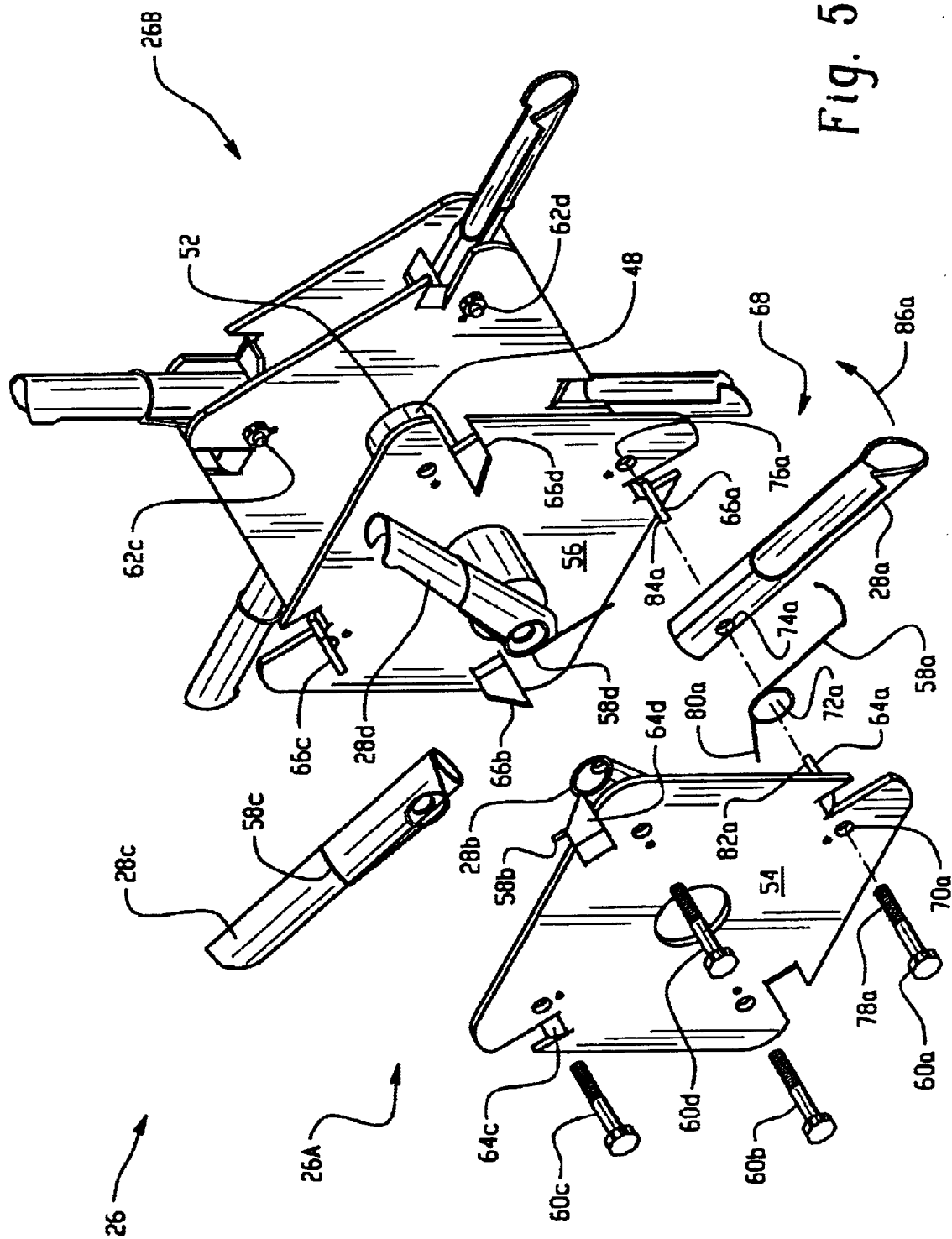
FIG. 5 is a partially exploded and partially assembled view of a plugger tine assembly section of the plug aerator of FIG. 1.

Now with reference to FIG. 5, the hole producing system 26 according to a preferred embodiment of the present invention is shown. The hole producing system 26 is comprised of two similar portions 26A and 26B that are offset by a predetermined angle relative to one another. Preferably, the predetermined angle is 45 degrees. By offsetting the portions 26A and 26B of the hole producing system 26 the plug aerator "walks" better during aeration due to at least one hole producing device 28 from each hole producing system 26 touching, engaging, or penetrating the section of ground 200 at a moment in time. These two portions 26A and 26B are coupled to the cylindrical or tube device 48 adjacent its ends. Preferably, the two portions are welded adjacent to the ends of the cylindrical or tube device 48, where one weld section 52 is shown and the other is hidden.

With continuing reference to FIG. 5, the portion 26A of the hole producing system 26 includes first and second plates 54 and 56, first through fourth of the hole producing devices 28a–28d, and first through fourth spring devices 58a–d. The hole producing devices 28a–d and the spring devices 58a–d are coupled to each other (as best seen by 28c/58c and 28d/58d) and then coupled between the plates 54 and 56. The portion 26A is securely coupled together with first connecting devices 60a–d, preferably bolts, and second connecting devices similar to 62c–d in portion 26B, preferably nuts. Also, section 26A comprises elongated extensions 64a–d extending from and adjacent to corners of and inside surface of plate 54 and elongated extensions 66a–d extending from and adjacent to corners of an inside surface of plate 56.

With further reference to FIG. 5, only an interconnection and interaction of one section 68 of four similar functioning sections of portion 26A of the hole producing system 26 will be discussed for convenience. The first connecting device 60a is inserted through an aperture 70a in the plate 54, through opening 72a in the spring 58a, through an aperture 74a in hole producing device 28a, and finally through an aperture 76a in the plate 56. After passing through aperture 76a, a second connecting device (not shown) similar to the second connecting devices 62 is secured to a threaded end 78a of the first connecting device 60a. After this interconnection, an articulating action of the hole producing device 28 is based on an interaction of a section 80a of the spring 58a and surfaces 82a of plate 54 and 84a or plate 56.

In operation, described with reference to FIG. 6 below, the hole producing device 28a articulates around the first connecting device 60a in the direction of arrow 86a, i.e., counter-clockwise, so that the hole producing device 28a does not damage an area surrounding an opening of a hole made in the section of the ground 200. This damage made by conventional stationary hole producing devices is caused by their lack of ability to be inserted and removed substantially normal to the section of ground 200, where the articulating action of the present invention allows for this to occur. Thus, damage is eliminated, or at least drastically reduced, around and in between the holes made in the engaged section of the ground 200 during aeration based on the articulation of the hole producing device 28 resulting from the interconnection and interaction of the elements in the hole producing system 26.

The operation of the plug aerator 10 according to a preferred embodiment of the present invention is shown in FIG. 6. Now with reference to FIG. 6, an operation of the plug aerator 10 according to a preferred embodiment of the present invention is shown. As an example and for ease of discussion only a step-by-step movement of one tine 28 during the operation is shown. The tine 28 is shown at different stages of interaction with the section of ground 200. During operation the plug aerator 10 moves in a direction of arrow 100, while the tine 28 moves clockwise in a direction of arrow 102. Initially, the plug aerator 10 is pulled forward in the direction of arrow 100, where the tine 28 moves from position 104 to position 106 causing the tine 28 to penetrate the section of ground 200. As the plug aerator 10 continues to move forward, the tine 50 is pushed further into the ground 200 at position 108 before being pulled/extracted from the ground 200 at position 110. In between positions 106 and 110, the tine 28 engages and extracts a core of ground material (not shown) leaving a cavity in the ground 200. The core of ground material is then flung or released from the tine 28 between positions 108 and 110 based on the articulating and spring action of the tine/spring configuration 28/58. The tine 28 then continues on its clockwise path to position 112, where tine 28 then repeats this path performed to continue engaging, extracting, and releasing cores of ground material until the plug aerator 10 is stopped.

Through the proper articulation of the hole producing devices 28 during entry and exit of the ground 200, the resulting hole sustains little or no collateral damage. Likewise the ground between resulting holes remains relatively undisturbed. This is in stark contrast to prior art systems with stationary tines that leave behind oblong hole openings and damaged ground.

From the above description of the invention, those skilled in the art will perceive improvements, changes and modifications in the invention. Such improvements, changes and modifications within the skill of the art are intended to be covered.

We claim:

1. An apparatus comprising:
a main frame;
an extension coupled to the main frame and configured to couple a moving device to the main frame;
pivoting side supports coupled to the main frame;
rotating wheels coupled to the side support; and
a longitudinal support system coupled to the main frame, the longitudinal support system comprises a hole producing system comprising radially articulating hole producing devices, at least one hole producing device being radially articulable relative to at least one axially adjacent hole producing device, the hole producing system including first and second portions coupled via a cylindrical device, wherein the first and second portions are offset at an angle of substantially 45 degrees relative to one another, wherein each one of the first and second portions include a pair of plates having a center aperture for receiving the cylindrical device, and wherein the articulating hole producing devices are coupled between the pair of plates via a coupling system.

2. The apparatus according to claim 1, wherein the main frame further comprises:
a first aperture operatively positioned relative to a pivot point of each of the side supports to couple the side supports to the main frame in a first position; and
a second aperture operatively positioned relative to the pivot point of each of the side supports to couple the side supports to the main frame in a second position.

3. The apparatus according to claim 2, wherein:
the first position is configured so that the apparatus moves without the hole producing devices touching a section of ground; and
the second position is configured so that the apparatus moves with the hole producing devices interacting with the section of ground.

4. The apparatus according to claim 1, wherein the longitudinal support system further comprises:
an axle;
first spacers configured to slide over the axle; and
second spacers configured to slide over the axle and into an aperture in the hole producing system.

5. The apparatus according to claim 4, wherein one completed section of the longitudinal support system is formed by sliding one of the first spacers left to right followed by a first one of the second spacers, the hole producing system, and a second one of the second spacers.

6. The apparatus according to claim 5, wherein the longitudinal support system comprises four of the completed section.

7. The apparatus according to claim 1, wherein the articulating hole producing devices comprise:
first through fourth tines; and
first through fourth springs coupled around the first through fourth tines resulting in first through fourth tine and spring devices;
wherein the first through fourth tine and spring devices are coupled adjacent first through fourth corners of the pair of plates by the coupling system.

8. The apparatus according to claim 7, wherein each of the pair of plates comprise first through fourth elongated extensions extending from an inside surface of the plate adjacent the first through fourth corners, wherein the elongated extensions interact with the first through fourth springs such that the articulating hole producing devices articulates in a counter-clockwise direction around a portion of the coupling system during aeration.

9. An aerating apparatus comprising:
a main frame; and
a rotatable hole producing system coupled to said main frame, said hole producing system including a plurality of individually radially articulable hole producing devices, at least one hole producing device being individually radially articulable relative to at least one axially adjacent hole producing device, said hole producing system being movable relative to said frame between an in-use position wherein at least one of said hole producing devices engages the ground and a not-in-use position wherein said hole producing devices do not engage the ground wherein each hole producing device is biased into a position wherein each hole producing device extends generally radially outwardly.

10. The apparatus of claim 9 wherein each hole producing device extends generally radially outwardly relative to a central axis, and wherein each hole producing device is radially articulable about said central axis.

11. The apparatus of claim 9 wherein each hole producing device is hollow and is shaped to remove a plug of material.

12. The apparatus of claim 9 wherein said hole producing system is shaped to be rolled across the ground and is configured such that each hole producing device engage the ground at a generally non-perpendicular angle thereof when said hole producing system is rolled across the ground.

13. The apparatus of claim 9 wherein at least one hole producing device is located an and angle relative to at least one axially adjacent hole producing device.

14. The apparatus of claim 9 wherein each hole producing device is spring biased into said position wherein each hole producing device extends generally radially outwardly.

15. The apparatus of claim 9 wherein each hole producing device is individually radially articulable relative to any axially adjacent hole producing devices.

16. The apparatus of claim 9 wherein said frame includes a pair of wheels coupled thereto, and wherein said frame is shaped and arranged such that said wheels engage the ground when said hole producing system is in said not-in-use position wherein said wheels do not engage the ground when said hole producing system is in said in-use position.

17. A method comprising the steps of:
 a) assembling an articulated extension by coupling tine and spring devices between a pair of plates, and operatively interacting the tine and spring devices with respective elongated extensions extending adjacent a corner and from an inside surface of each of the pair of plates such that the tine and spring devices can articulate;
 b) moving a hole producing apparatus over a section of ground;
 c) forming a hole in the section of ground with said articulating extension extending from the hole producing apparatus during the moving;
 d) extracting a core from the hole in the section in the section of ground after forming the hole without damaging an opening of the hole based on an articulating action of the articulating extension;
 e) releasing the extracted core based on the articulating action of the articulated extension; and
 f) repeating steps b) through e) until a predetermined amount of the section of ground is aerated.

18. The method according to claim 17, wherein the articulating action during the extracting and releasing step substantially eliminates damage caused between holes formed during aeration.

19. A core extracting plug aerator, comprising:
 a main frame;
 a draw bar coupled to the main frame and configured to couple a motorized device to the main frame;
 pivoting side supports coupled to the main frame, the side supports pivoting between and being secured in a moving position and an aerating position;
 rotating wheels coupled to the side supports; and
 a longitudinal support system coupled to the main frame, the longitudinal support system comprising a plugger system comprising radially articulating tines, at least one tine being radially articulately relative to at least one axially adjacent tine, the plugger system including:
  first and second portions, wherein each of the first and second portions are offset a by predetermine angle relative to one another and the first and second portions comprise:
   a pair of plates, each of the pair of plates having first through fourth elongated extensions extending from an inside surface of the plate, wherein the first through fourth elongated extension are located adjacent first through fourth corners of the plate; and
   first through fourth tine and spring devices coupled between the pair of plates via a coupling system, where the first through fourth tine and spring devices interact with the first through fourth elongated extensions such that the tine and spring devices articulate during aeration of a section of ground.

20. An aerating apparatus comprising:
 a main frame; and
 a rotatable hole producing system coupled to said main frame, said hole producing system including a plurality of individually radially articulable hole producing devices, at least one hole producing device being individually radially articulable relative to at least one axially adjacent hole producing device, said hole producing system being movable relative to said frame between an in-use position wherein at least one of said hole producing devices engages the ground and a not-in-use position wherein said hole producing devices do not engage the ground, and wherein each hole producing device is hollow and is shaped to remove a plug of material.

* * * * *